Oct. 18, 1927.
T. N. HANSEN
1,645,752
REPRODUCING DEVICE
Filed May 24, 1926
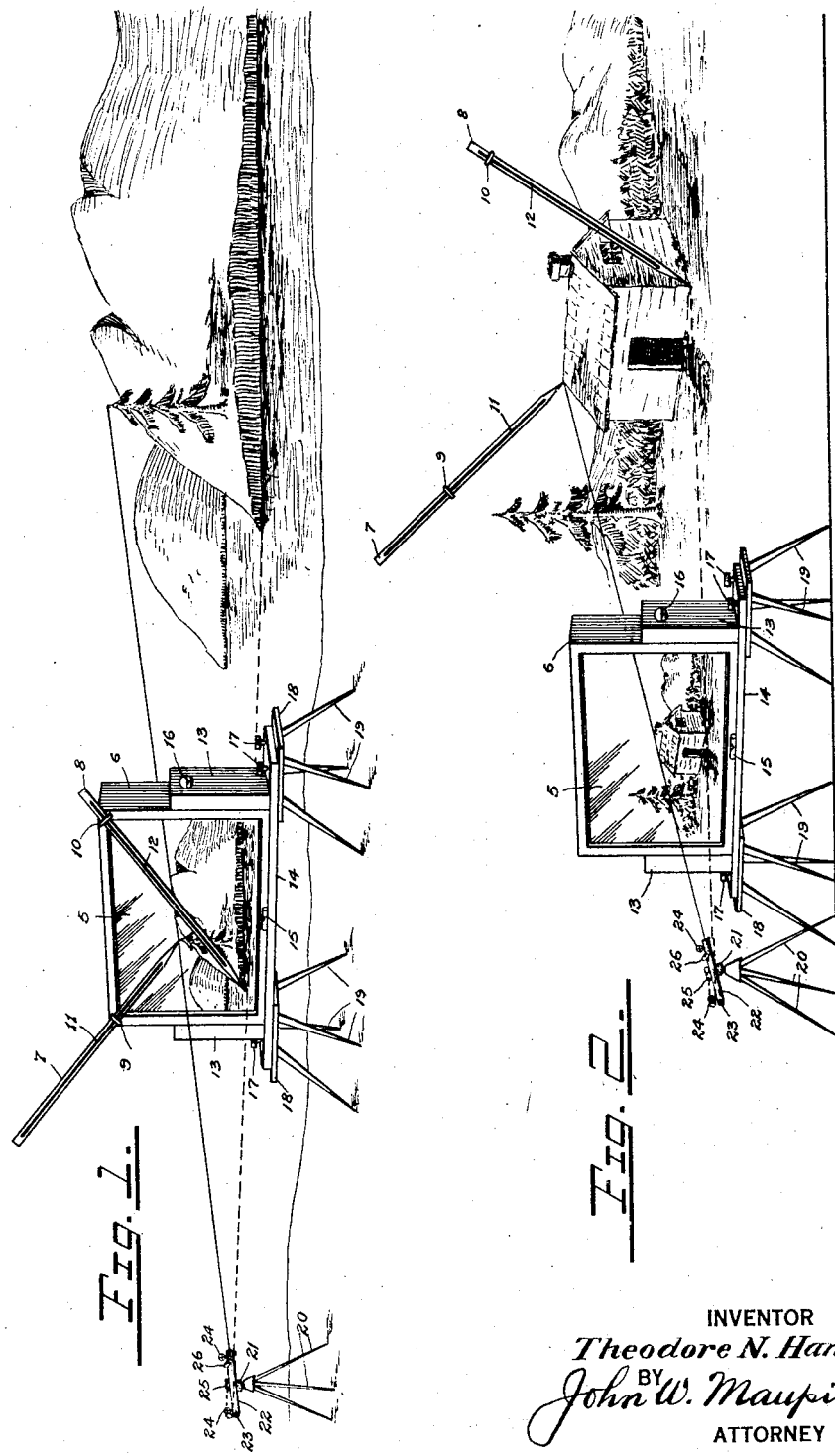
INVENTOR
*Theodore N. Hansen*
BY
*John W. Maupin*
ATTORNEY Patented Oct. 18, 1927.

1,645,752

UNITED STATES PATENT OFFICE.

THEODORE N. HANSEN, OF SEATTLE, WASHINGTON.

REPRODUCING DEVICE.

Application filed May 24, 1926. Serial No. 111,443.

My invention relates to reproducing devices and the principal objects of the invention are to provide a device comprising a sighting instrument in combination with a transparent screen interposed between said instrument and the objects to be reproduced whereby a number of salient points may be projected upon the screen and a true perspective of the objects may thus be obtained. Other objects are to provide means whereby the picture on the transparent screen may be projected upon a wall or other surface for decorative purposes. Further objects are to provide adjustable pointers for the screen together with a system of levels whereby both the instrument and screen may be placed in corresponding level adjustment.

With the above and other objects in view which will appear as the description proceeds, the invention consists of the novel construction, adaptation, combination and arrangement of parts hereinafter described and claimed. These objects are accomplished by devices illustrated in the accompanying drawings, wherein:—

Figure 1 is a view in perspective showing the instrument and screen mounted for reproducing objects from nature onto the screen; and Fig. 2 is a similar view showing the arrangement for projecting a picture from the screen onto a wall or other surface.

Referring to the drawings throughout which like reference numerals designate like parts, the numeral 5 indicates a transparent screen that is preferably made of glass and mounted in a frame 6. Two pointers 7 and 8 are pivotally and slidably mounted on said screen by means of thumb screws 9 and 10 passing through slots 11 and 12 therein and secured to the two upper corners of said frame respectively. It will thus be seen that the sharp ends of said pointers may be adjustably placed at any point on the screen, their lengths being equal to the diagonals of the screen.

The frame 6 is secured between two upright standards 13 that are mounted on a base-board 14 upon which said frame also rests. A spirit level 15 is fastened to said frame or board in longitudinal arrangement therewith and a level 16 is fastened transversely thereto on one of the uprights 13. Thumb screws 17, usually four in number with one at each corner, pass through said base-board with their lower ends engaging table tops 18 that are supported by legs 19 at either end of said board. The screen is set up in a substantially level position and then by manipulating said thumb screws same may be placed in level adjustment as indicated by the spirit levels.

The instrument comprises tripod legs 20 with a ball and socket 21 connecting the stand of same with the sighting tube 22. Said tube is provided with interior cross wire sights at either end thereof as indicated at 23 together with exterior sights 24 secured on its upper side at either end. By means of a level 25 centrally located on the upper side of the sighting tube disposed in longitudinal alignment therewith together with a transverse level 26 disposed at right angles thereto said instrument may be brought into correct level relation with the screen 5 both in a horizontal as well as a vertical plane.

Referring to Fig. 1 in the operation of the device the instrument is set up at a predetermined point and brought into level adjustment. The screen is then placed between said instrument and the landscape at a sufficient distance therefrom to intercept all the lines of sight included in the picture that is to be reproduced after same has been leveled up. The instrument is then sighted at the controlling points, such as the top of the tree, and one of the pointers is placed at the spot where the line of sight passes through the screen and a mark is made at this point. This process is repeated until a sufficient number of points on the screen has been determined for drawing in the picture. When drawing the picture I usually prefer to place the paper or canvas directly against the screen so the light will cause the points to show through and then sketch the picture directly thereon. It will now be apparent that I have provided means whereby a true perspective may be reproduced from natural objects to the screen.

The process of projecting a picture from the screen to a wall or other surface as shown in Fig. 2 is done by substantially the reverse procedure. In this case the instrument is usually placed closer to the screen and the pointers are mounted on the wall. This method is particularly advantageous in making mural decorations, stage scenery and the like. It is obviously unnecessary to describe this process in detail.

Having thus described my invention, it being understood that such minor changes may be resorted to as do not depart from its scope and spirit, what I claim and desire to secure by Letters Patent is:—

1. A reproducing device comprising in combination a sighting instrument, a transparent screen interposed between said instrument and the objects to be reproduced, and adjustable pointers, pivotally and slidably mounted on the upper corners of the screen respectively.

2. A reproducing device comprising in combination a sighting instrument having a sighting tube, a ball and socket mount for the instrument, the sighting tube of said instrument having both interior and exterior sights means for placing the horizontal axis of the instrument in true horizontal adjustment, means for placing the vertical axis of the instrument in true vertical adjustment, a transparent screen interposed between said instrument and the objective so as to intercept all the lines of sight to said objective, adjustable pointers pivotally and slidably mounted on the upper corners of the screen respectively whose lengths are as great as the diagonals thereof, and means for placing said screen in true horizontal and vertical adjustment.

In witness whereof, I hereunto subscribe my name this 15th day of May A. D. 1926.

THEODORE N. HANSEN.